June 30, 1970 C. C. J. MAUDUIT ET AL 3,518,456

APPARATUS FOR REGENERATING TIMER PULSES IN THE PROCESSING OF BINARY INFORMATION DATA

Filed April 21, 1967 4 Sheets-Sheet 1

3,518,456
APPARATUS FOR REGENERATING TIMER PULSES IN THE PROCESSING OF BINARY INFORMATION DATA

Christian Camille Jules Mauduit, Verrieres-le-Buisson, and Christian Gerard Maury, Montrouge, France, assignors to Compagnie des Compteurs, Paris, France, a company of France Filed Apr. 21, 1967, Ser. No. 632,627
Claims priority, application France Apr. 28, 1966, 59,435
Int. Cl. H03k *5/00, 4/00*
U.S. Cl. 307—269 11 Claims

ABSTRACT OF THE DISCLOSURE

Apparatus for generating timing pulses in the processing of binary information data comprising a pattern and peak detecting circuit connected to the signal source and followed by a monostable circuit which gives timer pulses to a switch or utilization circuit, characterized in that it comprises a variable frequency multivibrator having a triggering input connected to the output of the monostable circuit and a frequency control input connected to a frequency servo-circuit, the signals coming from said multivibrator being applied on the one hand to the input of the monostable circuit to cause it to trigger in response to an absence of input signals and on the other hand being applied to the input of the frequency servo circuit.

The present invention relates to an apparatus for generating timing pulses in a binary data processing system from the interpretation of signals which normally include a sequence of pulses spaced apart by the bit cell period. It may particularly be used in binary information data reading apparatus, those data being recorded on a magnetic movable support according to a process of the type "NRZ" (non-return to zero) in which phase modulation is utilized.

The series transmission of data in binary form has difficulties among which are that the tolerable variation in the rate at which data is transmitted is small, and also that, loss of one data bit contained in a block or word causes loss of all data in the block.

Analogous problems may arise in data processing devices when the position in time of a binary information data—or bit—characterizes its weight.

In the case of recording numeric data on a movable magnetic support, and for some special problems, where it is necessary to reconcile a minimum of bulkiness, a large recording time and a maximum of data, a track by track recording system is generally used without any special tract being reserved for recording timing pulses. In this case the data are series recorded and the timing information is included within the coded signal.

As a result reading of such recorded signals to obtain the data for subsequent utilization causes problems of the kind previously indicated.

The present invention now provides apparatus for generating timing pulses from information in binary form presented in a series of pulses which normally include a sequence of pulses spaced apart by the bit cell period, the apparatus comprising:

means responsive to such pulse series to provide a series of predetermined pulses corresponding thereto;

a monostable device responsive to said series of predetermined pulses to generate a timing pulse in response to each of said predetermined pulses provided that the predetermined pulse occurs not less than a predetermined time after the preceding predetermined pulse from which a timing pulse resulted;

an astable multivibrator and means for controlling the operation thereof;

said control means being arranged to control the operating frequency of said multivibrator in accordance with the frequency of said predetermined pulses from which timer pulses result;

said multivibrator being arranged for triggering in response to these latter pulses such that the operation of the multivibrator is synchronized therewith; and means coupling the output of said multivibrator to the input of said monostable device to trigger the latter in the absence of said predetermined pulse.

For a better understanding of the invention and to show how it may be put into practice an embodiment thereof will now be described with reference to the accompanying drawings in which.

The embodiment of the invention will be described in relation to the particular case of a magnetic recording, for example, on a medium such as a tape or a drum. The binary data is recorded by a non-return to zero (NRZ) method in which phase modulation is utilized. By phase modulation is meant that a change in signal level is associated with each bit cell and such changes occurs at the same relative time in their bit cells—for example at the beginning (end) of or midway through the cell period.

Figure 2:
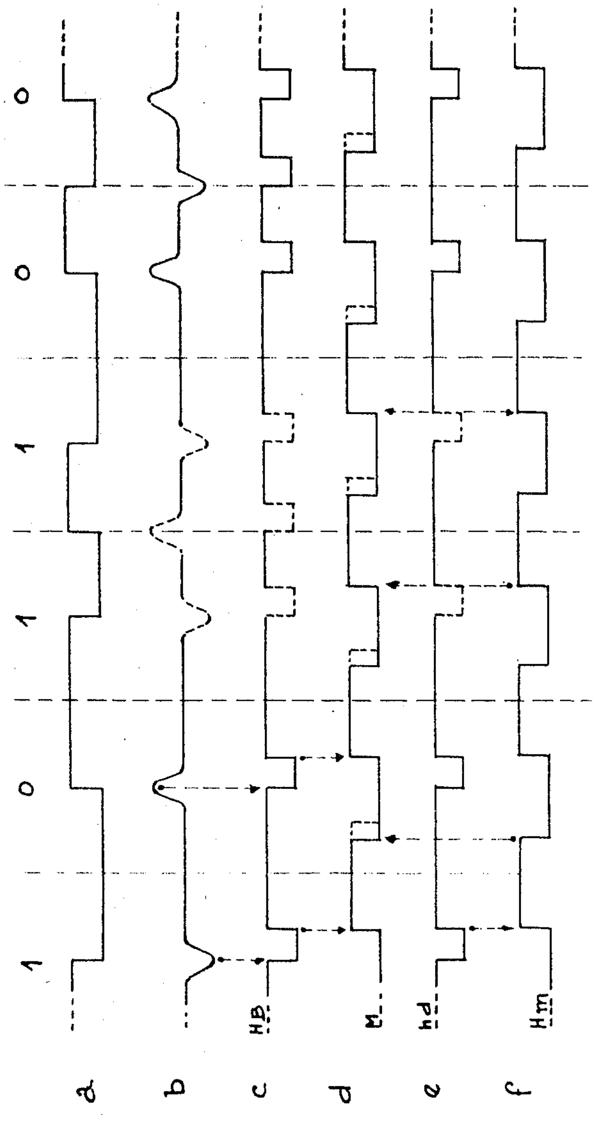
FIGS. 2 and 3 are explanatory diagrams.
Figure 3:
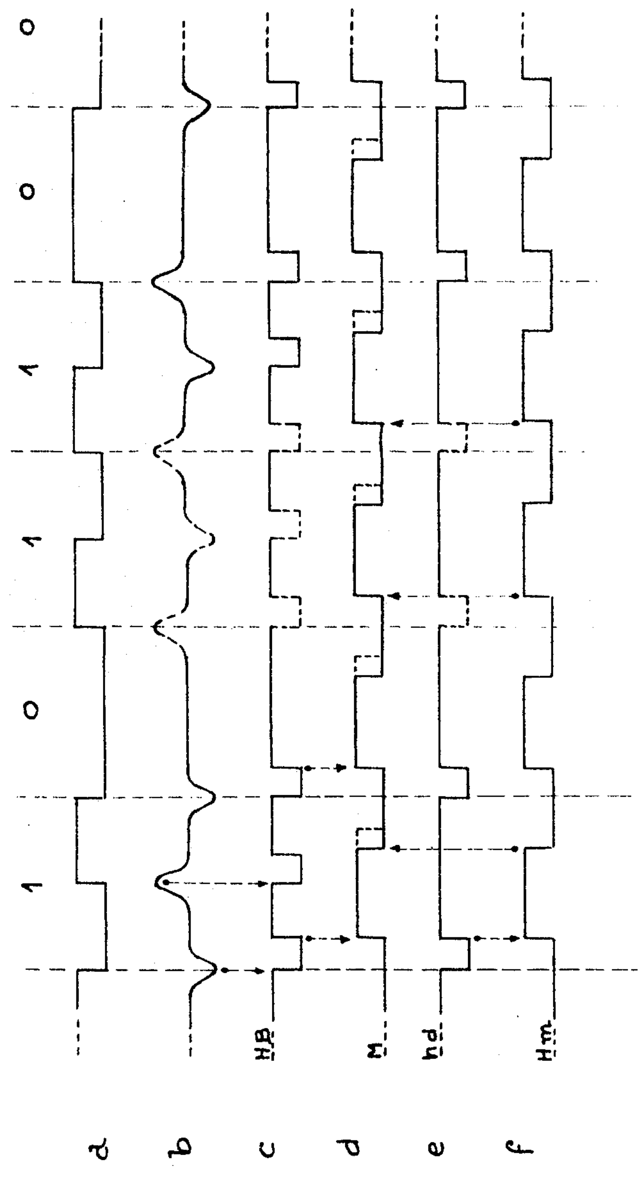

The signal level diagrams of FIGS. 2 and 3 exemplify this. The wave shape corresponding to an information data block, for example 101100, is represented by line *a*, FIGS. 2 or 3, in which vertical dash lines delimit the elementary cells corresponding to each information data bit.

In the recording process used in relation with FIG. 2, a change of the flux polarity is made in a positive direction in the middle of the elementary cell when recording a "0" and in a negative direction when recording a "1." In the process used in relation with FIG. 3, a positive or a negative change of the flux direction is made in the middle of the elementary cell to record a "1" but no change occurs to record a "0," a polarity reversal occurring nonetheless at the beginning of each cell period.

Figure 1:
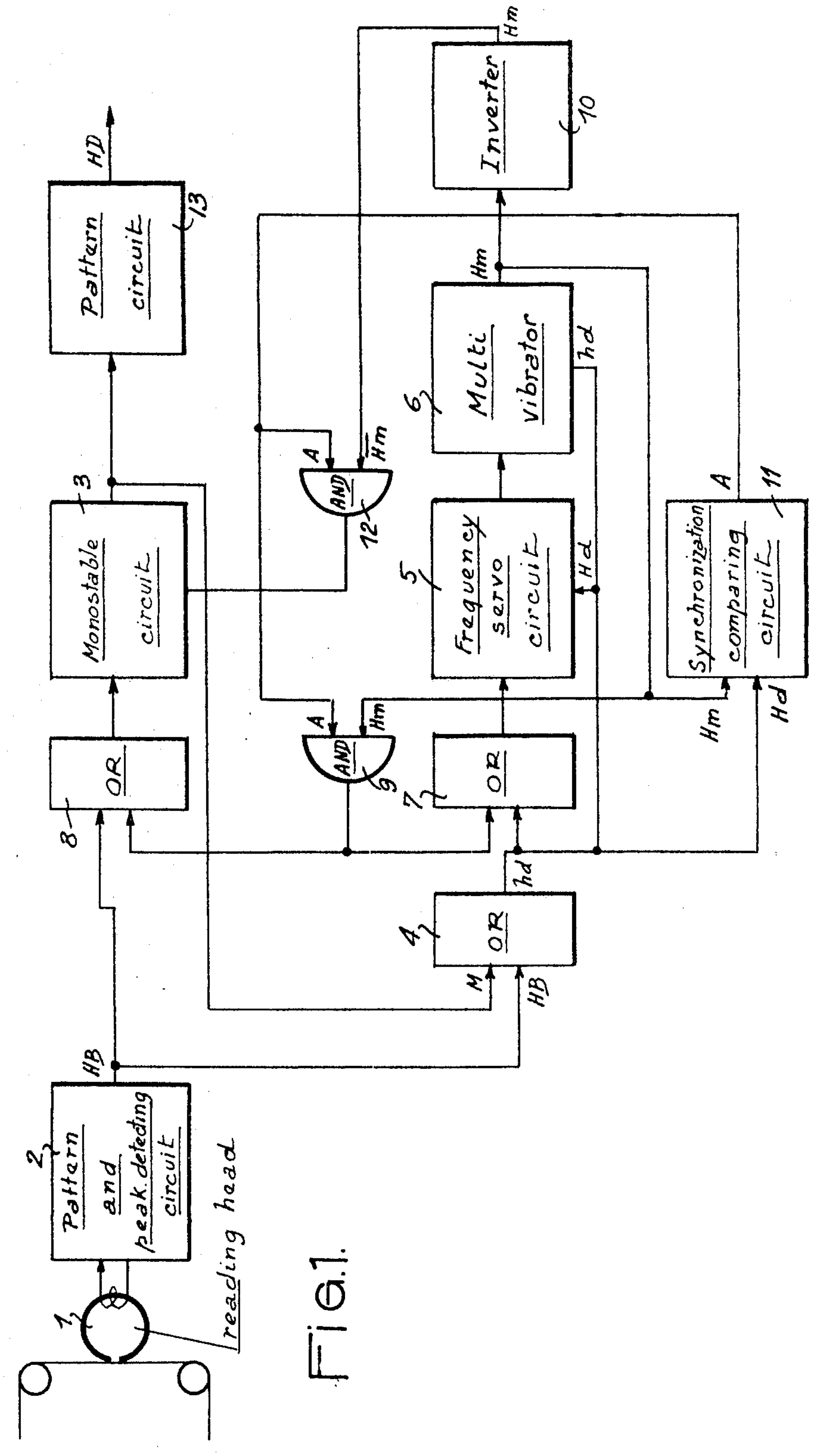
FIG. 1 is a block diagram of an apparatus according to the invention.

Referring now to FIG. 1, reference numeral 1 indicates a reading-head for reading from a magnetic tape, 2 a conventional pulse peak detecting circuit for the pulses from head 1, as disclosed, for example, in U.S. Pats. Nos. 2,961,642 or 3,064,243 and which is connected through an OR circuit 8 to a conventional monostable circuit 3 whose pulse period is higher than or at least equal to the half period of an elementary bit cell. The monostable 3 triggers a timing pulse generator, for example, another conventional monostable or pattern circuit 13 which can be of the type as disclosed in U.S. Pats. 2,935,736 or 3,007,143. Outputs of circuits 2 and 3 are connected through two OR circuits 4 and 7 to a frequency servo-circuit 5 of a symmetrical astable multivibrator 6 which provides signals H$m$. Signals $hd$ provided from the circuit 4 are also applied to a triggering input of the multivibrator 6. Reference numeral 11 indicates a logic circuit assembly of conventional design whose input receives the signals $hd$ and H$m$ and whose output gives a validation signal A when the signals H$m$ from the multivibrator are synchronous with $hd$ coming from the circuit. The logic circuit may, for example, be constituted by a flip-flop manufactured by Texas Instruments known as type SN5473 which is known as a Dual J–K Master-Slave Flip-Flop. This signal A is applied on two AND circuits 12 and 9. The circuit 12 allows the resetting of the monostable circuit 3 in its pause position by signals H$m$ resulting from the inversion of the signals H$m$ in an inverter circuit 10. The circuit 9 allows the application of the signals H$m$ to the OR circuits 7 and 8.

The operation of this apparatus will be now explained and the explanation may be read with reference to the wave forms of either FIG. 2 or 3 in which curves $a$ to $f$ represent like signals. In a reading operation, reading signals obtained in the winding of the head 1 have the shape indicated in the line $b$ of FIGS. 2 or 3. Those signals are converted, in circuit 2 to rectangular pulses HB indicated on curve $c$. Pulses HB, when present, control through the OR circuit 8 the triggering of the monostable circuit 3 which, in turn, generates rectangular signals M represented on line $d$ as indicated by down arrows.

The circuit above described enables logic circuits to switch the binary information data "1" and "0" to two separate channels. Timing pulses HD are moreover obtained by controlling the monostable or pattern circuit 13 by the signals M and allow the location of the individual bits within an information data block.

However, in the case when information data are lost, for example, because of some defects in the sensitive coating of the magnetic support, the monostable 3 cannot be triggered by non-existent signals HB. An example is shown in curves $b$ and $c$ in which missing signals are shown in chain lines.

In order to provide timing pulses in the absence of input pulses, means are provided to correctly trigger the monostable 3 despite a lack of the signals HB. In normal working, signals HB and M applied to the OR circuit 4 furnish triggering pulses $hd$ indicated on line $e$. These pulses $hd$, when they exist, are used on the one hand, to directly trigger the multivibrator 6 and, on the other hand, to control the frequency servo-circuit 5 through the OR circuit 7. The multivibrator 6 produces signals H$m$ represented on line $f$ which, by way of the AND circuit 9, control triggering of the monostable 3 through the OR circuit 8, and also control the servo-circuit 5 through the OR circuit 7.

In order to assure steadiness of the servo, signals H$m$ when pulses $hd$ exist—that is to say when the data input signals really exist—may only act when they are synchronous with the latter as checked by the circuit 11. The validation signal A provided by circuit 11 is thus utilized to unblock the AND circuit 9 when this synchronization is found to exist. The symmetrical signals H$m$ of the multivibrator 6 have, for stability purposes, a period slightly higher than the period of the servo pulses $hd$, and are also used, after being inverted in 10, to reset the monostable circuit 3 in its normal state by way of the AND circuit 12, unblocked when the validation signal A is provided. Resetting the circuit 3 occurs earlier than it would due to the natural period of the circuit indicated by the dashed lines of curve $d$, and resetting is effected once for each elementary cell period within an information data block, and this feature allows the apparatus to tolerate a considerable deviation in the rate of information data arrival.

Thus, it is seen that in the above-mentioned case of loss of information data, the monostable 3 is, despite the lack of signals HB triggered by the locally generated signals H$m$ as indicated by vertical up-arrows at the time when the input signals are lost. Operation takes place as if the multivibrator worked in the manner of a flywheel ircuit, i.e. with an electrical momentum effect, when synchronization signals are lost.

In the schematic diagram of FIG. 1, the details of the block circuits will be apparent to those in the art though something further should be said about circuits 5 and 11 which will hereinafter be described in a somewhat more detailed manner.

Figure 4:
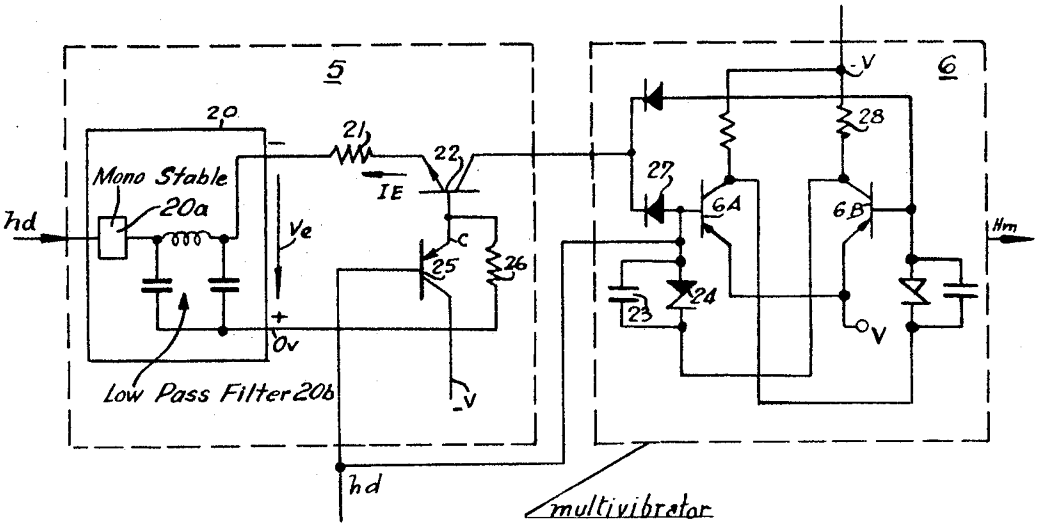
FIG. 4 represents a frequency servo-circuit of the multivibrator shown in FIG. 1.

FIG. 4 represents a simplified embodiment of the servo-circuit 5 provided to adjust the frequency of the signals H$m$ from the multivibrator to the frequency of the received signals $hd$. The input of this circuit comprises a frequency-voltage converter unit 20, for example, a monostable circuit 20$a$ of conventional design to generate pulses of convenient width from the pulses $hd$, followed by a low-pass filter 20$b$ whose cutoff frequency is lower than the minimum recurrence frequency of the signal $hd$ provided from the circuit 7. This low-pass filter may, as shown, comprise two capacitors and an inductance connected in a $\pi$ network. This filter is followed by a resistor 21, series connected to a transistor 22 whose collector is connected to one of the elements of a transistorized multivibrator 6, through a diode 27, at the base of transistor 6A of the multivibrator.

The base of transistor 22 is connected to the emitter of an emitter-follower transistor 25 and controlled by the pulses $hd$ applied on its base: the emitter of said transistor 22 is also connected through a resistor 26 to the output of the low-pass filter unit in the converter 20, and its collector to a negative voltage source $-v$.

Assuming that the low-pass filter in converter 20 has a phase-frequency characteristic such that the phase difference introduced by said filter is nil in the pass band, this filter gives at its output a voltage V$e$ equal to the mean value of the input signal, i.e. so that:

$$Ve = K_1 \cdot fe \qquad (1)$$

$fe$ being the recurrence frequency of the signals $hd$.

The voltage V$e$ is then used to control the frequency of a resistor-capacitor multivibrator 6 such that charging of the capacitor 23 therein is made to a constant voltage, the discharge of the capacitor being effected at a constant current.

Assuming the transistor 25, whose function will be revealed hereinafter, is controlled so that the emitter potential be near to zero, the base emitter voltage of the transistor 22 is roughly equal to V$e$, and a current $I_E$ circulates in the resistor 21 through the transistor 22. The value of current $I_E$ is not very different from $Ve/R$, R being the value of the resistor 21.

This being said, the circuit 6 works as a multivibrator. During one-half period, capacitor 23 is charged through resistor 28 to the voltages $U_z$ of the Zener diode 24 connected across its terminals. When the Zener diode becomes conducting, it terminates the charging of the capacitor 23 and conducts through the transistor 6A a constant base current, approximately equal to $$\frac{V-U_z}{R_1}$$

where $R_1$ is the value of the resistor 28, during remainder of the multivibrator half-period. At the end of this half-period, transistor 6B begins conducting, transistor 6A is blocked and capacitor 23 discharged through the diode 27 and the transistor 22, at a constant current $I=V_e/R$. Actually, if the transistor 22, is such that its gain is very close to one, the collector current $I_C$ is roughly equal to the emitter current $I_E$ during all the duration of the discharge.

In those conditions, it is possible to write that the period T$m$ of the multivibrator 6 so controlled by the current $I_E=V_e/R$ is practically $$Tm = 2\frac{CU_z}{i_E}$$

where C represents the value of the capacitor 23.

In other words, the frequency $fm$ of said multivibrator is related to the current $I_E$ and so to the control voltage $Ve$ by a linear relation so that the frequency $fm$ of the multivibrator may be written:

$$fm=K_2Ve \quad (2)$$

Eliminating $Ve$ from the Equations 1 and 2, it is thus obvious that $$fm=K_1 \cdot K_2 \cdot fe \quad (3)$$

If the circuits 5 and 6 are so made that the product $K_1 \cdot K_2$ be equal to 1, one has:

$$fe=fm$$

It remains now to give the function of the emitter-follower transistor 25. Although the frequency of the multivibrator is servo-controlled, it is still necessary to obtain synchronization of the pulses at the frequencies $fm$ and $fe$. The functioning of the timing frequency pulse generation depends closely upon the quality, i.e. steadiness, preciseness, speed, of the servo-frequency control.

The steadiness, more particularly the thermal steadiness, as well as the preciseness depend upon the care taken in the component manufacture technology. However, the speed cannot be infinite; it has been supposed that the low-pass filter 20*b* in the converter unit 20 did not bring any phase difference, but in practice, this is not true. As one knows that to synchronize a multivibrator whose oscillating frequency is $fm$, on pulses whose frequency is $fe$, it is necessary to have at every moment $fm \leq fe$. Because of the delay caused by the filter, for some variation in the control frequency $fe$, such as when $fe$ drops, it could happen that $fm$ is higher than $fe$. Thus, it is necessary to provide means to allow for these practical requirements.

For that purpose, the greatest time difference between the *hd* and H*m* signals which are supposedly synchronous at nearly every moment can be deducted from the highest frequency difference between $fe$ and $fm$, caused by the delay of the filter.

To obtain a synchronization of signals *hd* and H*m*, pulses *hd* are provided with a width greater than the so determined greatest time difference, and the discharge of condenser 23 is blocked during duration of the pulse *hd* to prevent an untimely triggering of the multivibrator, such triggering being actually produced only by the end of pulse *hd* applied at the multivibrator triggering input.

Figure 5:
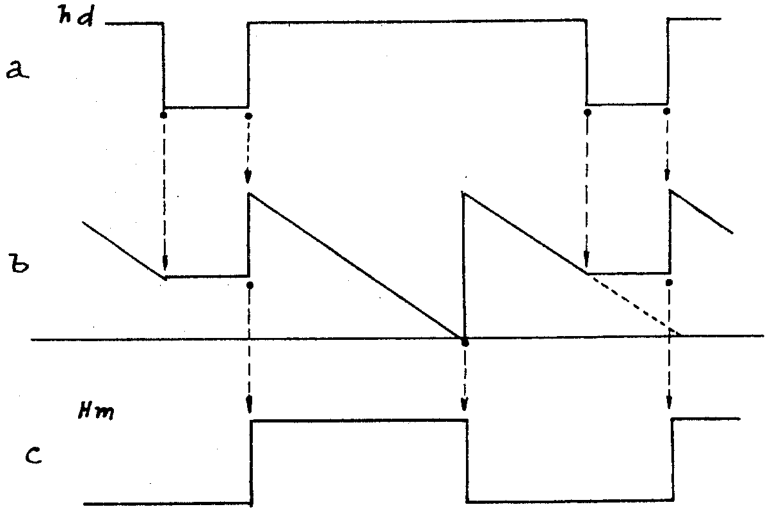
FIG. 5 is an explanatory diagram for FIG. 4.

FIG. 5 shows signals *hd* (line *a*) blocking during their duration, the discharge of the condenser 23 (line *b*), and the trailing edge of pulse *hd* triggering the multivibrator (line *c*).

In the circuit of FIG. 4, blocking of the condenser discharge 23 is done by transistor 25 during the duration of pulses *hd*. Actually, if the base of the transistor 25 is biased at a negative potential U, such that $|U|>|Ve|$, its emitter and thus the base of the transistor 22 are brought to a potential near to U. The result is that transistor 22 is blocked, its base-emitter voltage being negative.

The above circuit thus ensures a synchronization of the pulses at frequencies $fm$ and $fe$ in normal working. However, in transitory working, such as starting of the recording medium, or disappearance of the pulses *hd*, it may be necesary to forbid the generation of timer pulses from the pulses H*m* up to the synchronization of the two frequencies, either because the multivibrator has not yet reached the required frequency, or because the frequency of the multivibrator has drifted after a long absence of the pulses *hd*.

It is possible to experimentally determine the time necessary for the multivibrator to come up to frequency and to cause prohibition of the pulses *Hm* during this time. But use of a synchronous detector is preferred, the principle of which consists in verifying at every time:

on the one hand, if the leading edges of pulses H*m* come during duration of pulses *hd*, on the other hand, if the pulses *hd* occur during the second half of the oscillating period of the multivibrator.

The first condition indicates that the frequencies $fm$ and $fe$ are nearly identical; the second condition indicates that the leading edges of the pulses H*m* come after the pulses *hd* which constitute the uncoupling condition for the assembly.

If the first condition is set, $X=1$ is displayed on a bistable, $X=0$ being displayed in the contrary case. $Y=1$ is displayed on another bistable if the second condition is set; $Y=0$ in the contrary case.

When $X=1$ and $Y=1$, a second pair of bistables X′, Y′ identical to the first one is validated. If on a given instant, $X=Y=X'=Y'=1$, one may assert that:

(a) the frequencies $fe$ and $fm$ are nearly identical,
(b) the leading edges of the pulses H*m* appear after the pulses *hd* (or simultaneously).

Thus, synchronization is indicated and the bistables give the validation signal A, for example, by way of an AND circuit which with the bistables constitutes the circuit 11. The circuit 11 is so connected that in case of lack of the signal *hd*, the signal A is likewise delivered. As previously indicated, Type SN5473 flip-flops produced by Texas Instruments Company may be used for X, X′ and Y, Y′. This type of flip-flop is firstly biased by a signal applied on one of its two inputs so that the ulterior provision of a pulse on its third clock input causes the triggering thereof.

In case of lack of the pulses *hd*, blocking of the discharge of the multivibrator 6 condensers does not occur anymore, and the multivibrator begins to oscillate freely and performs as a free-running generator. The frequency at which it oscillates is near, but a little lower than the last frequency of the pulses *hd* before they disappeared.

As already said, this apparatus permits, particularly, large variations of the information data signals. As an example, it has been found that satisfactory functioning is obtainable with frequency variation on the information data to be processed, up to ±35% distributed as follows:

±20% tolerance on the control frequency,
±15% fast frequency variations in the modulation band (0 to 5 kHz.) for a 40 kHz central frequency.

The apparatus has been found to give excellent results in all conventional cases of information data loss inherent to magnetic recording. It can be used, in a general way, for other purposes, and particularly, in processing system using series coded informations data, each time the place in time of an information data bit is characteristic of its weight.

In summary, the apparatus above described enables the following advantages to be realized:

It allows a correct computation of the bits of a coded message or of a character from the synchronization of the timing cycle and consequently enables the location at any time of the weight of a bit.

Considerable variations in the information data frequencies can be tolerated. The frequency deviation is actually limited only by the linearity of the servoed multivibrator, its response period and by the monostable averaging time.

It allows the detection and location of eventual failures by comparing respectively, the presence of the timing pulses provided from the multivibrator.

Moreover, associated with a longitudinal parity control device, it allows correction of the failures in some cases.

What is claimed is:

1. Apparatus for generating timing pulses from information in binary form presented in a series of pulses which normally include a sequence of pulses spaced apart by the bit cell period which comprises;

means responsive to said pulse series to provide a series of predetermined pulses corresponding thereto;

a monostable device responsive to said series of predetermined pulses for generating a timing pulse in response to each of said predetermined pulses provided that said predetermined pulse occurs not less than a predetermined time after the preceding predetermined pulse from which a timing pulse resulted;

an astable multivibrator;

means controlling the operating frequency of said multivibrator in accordance with the frequency of said predetermined pulses from which timing pulses result;

said multivibrator being arranged for triggering in response to these latter pulses such that operation of said multivibrator is synchronized therewith; and means coupling the output from said multivibrator to the input of said monostable device to trigger said monostable device in the absence of said predetermined pulses.

2. Apparatus as defined in claim 1 and which further includes an OR-circuit having a first input connected to the output of said monostable device and a second input connected to receive said predetermined pulses, the output of said OR-circuit being connected to said multivibrator to supply said triggering pulses to said multivibrator.

3. Apparatus as defined in claim 1 and which further includes a first OR-circuit having a first input connected to the output of said monostable device and a second input connected to receive said predetermined pulses, a second OR-circuit having a first input connected to the output of said multivibrator and a second input connected to the output of said first OR-circuit, the output of said second OR-circuit being connected to said frequency controlling means to supply pulses thereto for controlling the frequency of said multivibrator.

4. Apparatus as defined in claim 1 and which further includes an inverter coupled between the output of said multivibrator and the input of said monostable device thereby to provide pulses to restore said monostable device to its stable state.

5. Apparatus as defined in claim 1 wherein said means controlling the operating frequency of said multivibrator comprises a frequency-voltage converter, a transistor connected to receive the voltage from said converter through a series resistance, said transistor being coupled to time-constant determining elements of said multivibrator to control the discharge of capacitance therein through said resistance and thereby the operating frequency of said multivibrator.

6. Apparatus as defined in claim 5 in which said transistor has a gain near unity.

7. Apparatus as defined in claim 5 wherein the base of said transistor is coupled to receive said triggering pulses for said multivibrator to control said synchronization of said multivibrator.

8. Apparatus as defined in claim 5 wherein said frequency-voltage converter comprises a low-pass filter having a cut-off frequency lower than that of said bit cell frequency.

9. Apparatus as defined in claim 1 and which further includes logic circuitry arranged to compare the multivibrator output pulses and said triggering pulses for said multivibrator and to control said means which couple said multivibrator to said monostable device such that when said triggering pulses exist said monostable device is only triggered by the multivibrator output pulses if synchronism exists between the multivibrator output pulses and said triggering pulses.

10. Apparatus as defined in claim 9 wherein said coupling means comprises two AND-circuits and an inverter for inverting the multivibrator output pulses, and wherein said logic circuitry for comparing said multivibrator pulses and said triggering pulses emits pulses only when said compared pulses are synchronous, said pulses from said logic circuitry being applied to a respective input of each of said AND-circuits, one of said AND-circuits being coupled between the output of said inverter and the input of said monostable device, and the other AND-circuit being coupled between the output of said multivibrator and said frequency control means thereby to control the application of pulses from said multivibrator thereto.

11. Apparatus for generating timing pulses from information in binary form presented in a series of pulses which normally include a sequence of pulses spaced apart by the bit cell period which comprises:

a pattern and peak detecting circuit responsive to said pulse series for producing a series of predetermined pulses corresponding thereto;

a monostable circuit responsive to said series of predetermined pulses for generating a timing pulse in response to each of said predetermined pulses provided that said predetermined pulse occurs not less than a predetermined time after the preceding predetermined pulse from which a timing pulse resulted;

a first OR-circuit having as one input thereto the output from said pattern and peak detecting circuit, the output from said first OR-circuit being connected as the input to said monostable circuit;

a multivibrator;

a frequency servo-circuit for said multivibrator;

an inverter connected to the output of said multivibrator;

a second OR-circuit having as inputs thereto the output from said monostable circuit and the output from said pattern and peak detecting circuit, the output from said second OR-circuit being connected to said frequency servo-circuit and also to said multivibrator to supply triggering signals thereto;

a third OR-circuit having as one input thereto the output from said second OR-circuit, the output from said third OR-circuit being connected to said frequency servo-circuit;

a pulse synchronization comparing circuit having as inputs thereto the output from said second OR-circuit and the output from said multivibrator; and first and second AND-circuits for producing a validation signal, said first AND-circuit having as inputs thereto the output from said inverter and the output from said synchronzation comparing circuit, and the output from said first AND-circuit being connected to said monostable circuit to restore it to its pause state, said second AND-circuit having as inputs thereto the output from said multivibrator and the output from said synchronization comparing circuit, and the output from said second AND-circuit being connected as the other inputs to said first and third OR-circuits.

References Cited

UNITED STATES PATENTS

| | | | |
|---|---|---|---|
| 2,980,858 | 4/1961 | Grondin et al. | 328—63 |
| 3,080,487 | 3/1963 | Mellott et al. | 328—120 X |
| 3,153,762 | 10/1964 | Johnson | 328—63 |
| 3,181,075 | 4/1965 | Klaas | 328—167 |

DONALD D. FORRER, Primary Examiner

S. D. MILLER, Assistant Examiner

U.S. Cl. X.R.

307—232, 268; 328—63, 72, 120, 164